UNITED STATES PATENT OFFICE.

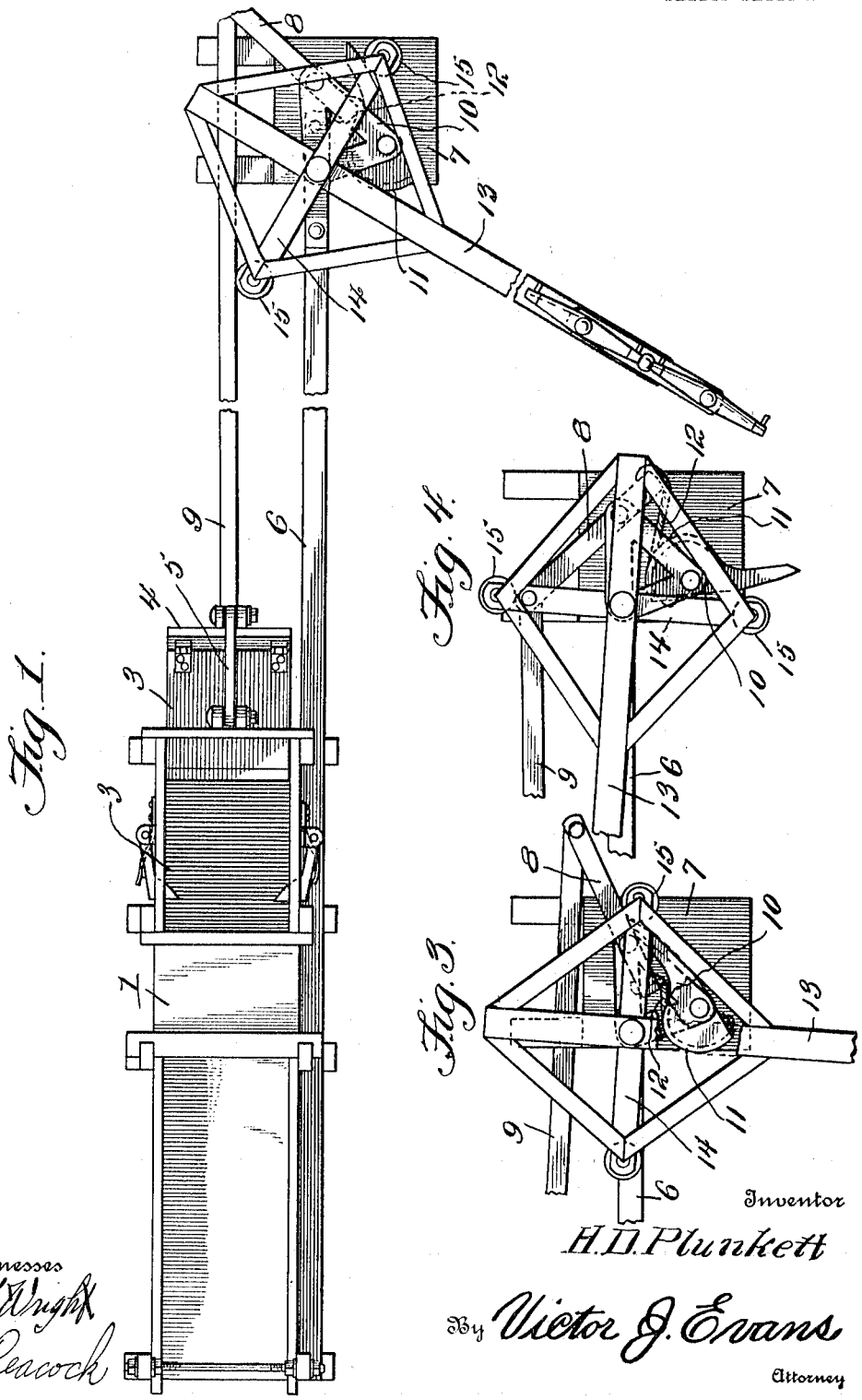

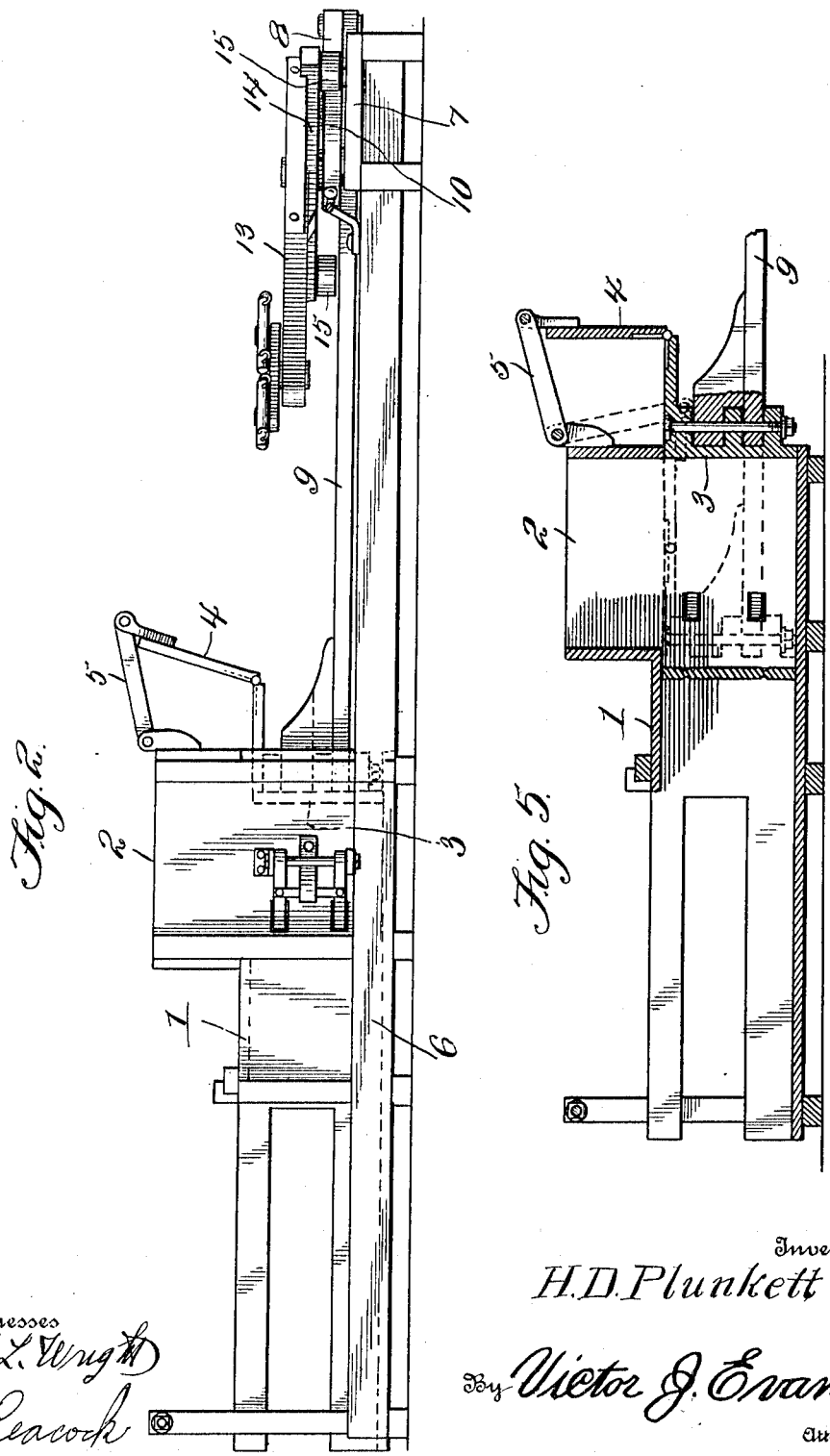

HENRY D. PLUNKETT, OF CENTER, MISSISSIPPI.

BALING-PRESS.

1,116,114. Specification of Letters Patent. Patented Nov. 3, 1914.

Application filed February 18, 1914. Serial No. 819,447.

*To all whom it may concern:*

Be it known that I, HENRY D. PLUNKETT, a citizen of the United States, residing at Center, in the county of Attala and State of Mississippi, have invented new and useful Improvements in Baling-Presses, of which the following is a specification.

This invention relates to baling presses and it consists in the novel features hereinafter described and claimed.

An object of the invention is to provide in combination with a baling press comprising a baling box and a plunger movably mounted therein means for closing the opening in the box behind the plunger as it moves on its compression stroke in order to prevent hay from entering the box behind the plunger and thus interfering with the retractive stroke of the plunger.

A further object of the invention is to provide a simple and durable plunger operating mechanism which in turn is adapted to be operated by a sweep mounted for rotation beyond the end of the baling box. The said plunger operating mechanism comprises a lever fulcrumed upon a platform which is connected by means of a beam with the baling box. One end of the said lever is pivotally connected with the pitman which is operatively connected with the plunger. A second lever is fulcrumed upon the said platform and the working end of the last mentioned lever is connected by means of a cable with the power end of the first mentioned lever. A sweep is pivoted upon the platform and is provided with laterally disposed arms which carry rollers. The said rollers are adapted to encounter the said levers alternately as the sweep is rotated and are adapted to transmit the operating power from the sweep to the levers as will be hereinafter explained.

In the accompanying drawings:—Figure 1 is a top plan view of the press. Fig. 2 is a side elevation of the same. Fig. 3 is a top plan view of a portion of the press with parts broken away showing the parts in one position. Fig. 4 is a top plan view of a portion of the press showing the parts in another position. Fig. 5 is a vertical longitudinal sectional view of parts of the press.

The press comprises a baling box 1 provided at its top with the usual receiving hopper 2. The said box 1 may be of any usual form. A plunger 3 is slidably mounted in the box 1 and a gate 4 is hingedly connected with the upper rear portion of the said plunger. A link 5 is pivotally connected at one end with the free edge portion of the gate 4 and is pivotally connected at its other end with the end of the box 1. The gate 4 is so arranged that it swings to a horizontal position over the inlet opening of the box as the plunger 3 moves along its compression stroke and consequently the said gate prevents the hay or material from falling into the box 1 from the hopper 2 and behind the said plunger. A beam 6 is connected with the box 1 and a platform 7 is mounted upon the said beam 6. A lever 8 is fulcrumed upon the platform and one end of a pitman 9 is pivotally connected with one end of the lever 8. The other end of the pitman 9 is pivotally connected with the plunger 3 in any suitable manner. A lever 10 is also fulcrumed upon the platform 7 and is provided with a cam or offset 11. A cable 12 or other flexible member is connected at one end with the working end of the lever 10 and the said cable is also connected with the power end of the lever 8. A sweep 13 is pivoted upon the platform 7 and carries a transversely disposed arm 14. Rollers 15 are journaled under the end portions of the arm 14 and are adapted to encounter the levers 8 and 10 as the sweep 13 is rotated upon the platform.

The operation of the press is as follows presuming that the plunger 3 is at the end of its compression stroke and the sweep 13 is being rotated, one of the rollers 15 will encounter the power end of the lever 10 and swing the said lever. As the said lever swings the cable 12 is moved longitudinally and this movement is increased by reason of the fact that the cam 11 is brought into contact with the intermediate portion of the said cable. As the cable moves as above indicated the lever 8 is swung upon its fulcrum whereby the pitman 9 is moved longitudinally and the plunger 3 is retracted in the box 1. The said roller 15 then encounters the lever 8 and swings the same upon its fulcrum so that the pitman 9 is moved longitudinally and the plunger 3 is moved in the box 1 on its forward or compression stroke.

Therefore it will be seen that a simple and durable mechanism is provided for operating the plunger and at the same time the plunger is provided with a hinged gate adapted to prevent the entrance of hay or material from the hopper behind the plunger and interfering with the retractive stroke of the same.

Having described the invention what is claimed is:—

A baling press comprising a box, a plunger mounted therein, a beam connected to the box, a platform mounted upon the beam, a lever fulcrumed upon the platform and operatively connected with the plunger, a second lever also fulcrumed upon the platform and having a cam end portion, a cable connecting said levers together, a sweep pivoted upon the platform and having an arm provided with a roller adapted to encounter both of said levers when said sweep is turned.

In testimony whereof I affix my signature in presence of two witnesses.

HENRY D. PLUNKETT.

Witnesses:
R. A. McGee,
J. R. McGee.

Copies of this patent may be obtained for five cents each, by addressing the "Commissioner of Patents, Washington, D. C."